United States Patent
Tackett et al.

[11] 3,910,299
[45] Oct. 7, 1975

[54] TRANSPORTATION OF WAXY HYDROCARBON MIXTURE AS A SLURRY

[75] Inventors: James E. Tackett; Paul H. Stewart, both of Littleton, Colo.

[73] Assignee: Marathon Oil Company, Findlay, Ohio

[22] Filed: Nov. 15, 1974

[21] Appl. No.: 524,008

[52] U.S. Cl. .................. 137/13; 208/37; 208/93; 302/66; 264/9
[51] Int. Cl.² ............................................. F17D 1/16
[58] Field of Search ............ 137/13; 208/93, 24, 37, 208/370; 302/66; 264/9, 14, 11

[56] References Cited
UNITED STATES PATENTS
3,846,279  11/1974  Merrill .......................... 137/13 X Primary Examiner—Alan Cohan
Attorney, Agent, or Firm—Joseph C. Herring; Richard C. Willson, Jr.; Jack L. Hummel

[57] ABSTRACT

Hydrocarbon mixtures containing 1–80% wax, e.g. shale oil, can be transported in a pipeline by distilling the mixture into an overheads fraction and a bottoms fraction, cooling the overheads fraction to a temperature above its pour point, but to a temperature sufficiently low so that when it is admixed with the bottoms fraction, the composite temperature of the mixture will be at or below the temperature at which the mixture is to be transported, and admixing the overheads fraction with the bottoms fraction (at a temperature above that at which wax crystals form) while imparting to the mixture a shear rate less than about 20 sec$^{-1}$ to form a pumpable slurry. The slurry is preferably transported in a pipeline at conventional temperatures.

17 Claims, 1 Drawing Figure

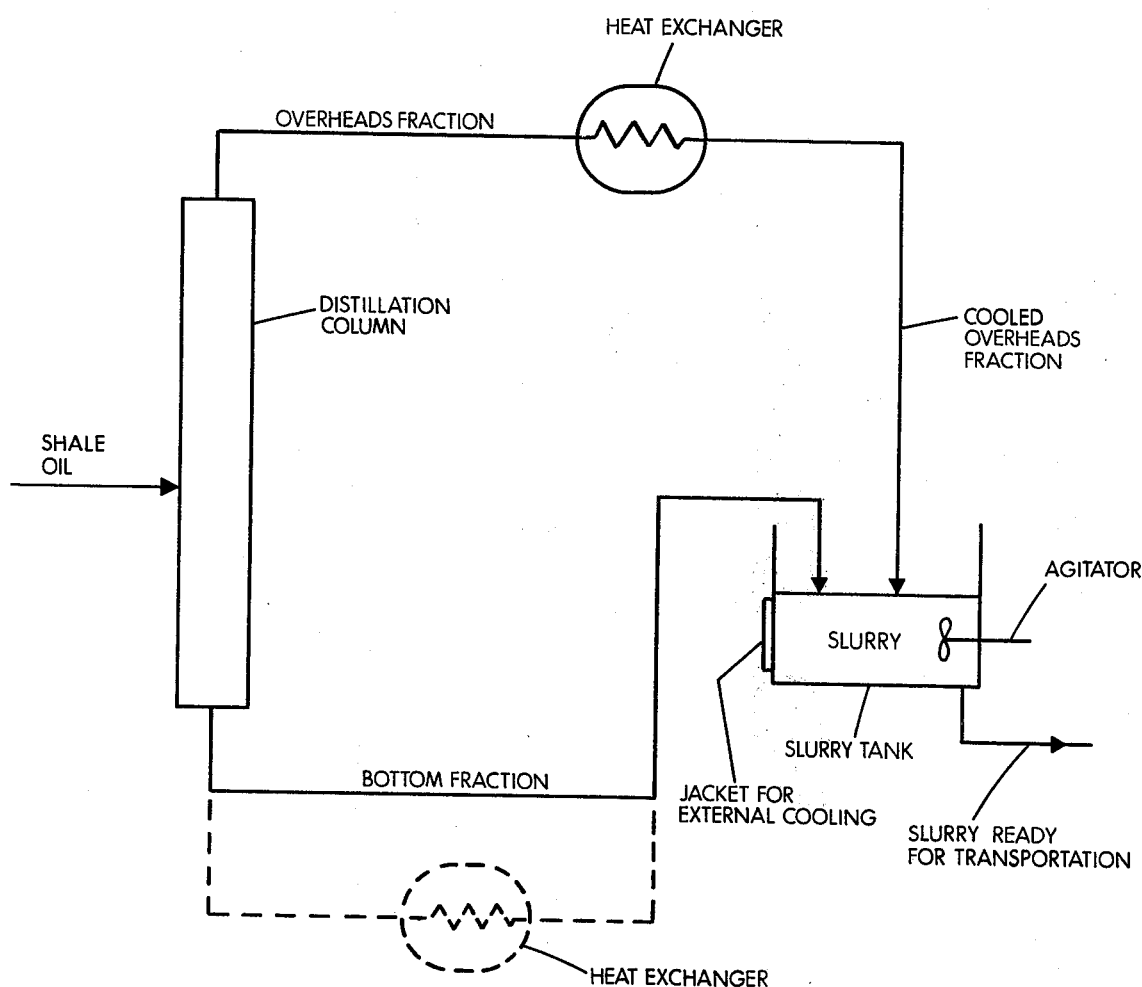

TRANSPORTATION OF WAXY HYDROCARBON MIXTURE AS A SLURRY

BACKGROUND OF THE INVENTION

1. Field of the Invention

Wax containing hydrocarbon mixtures are transported in a conduit by distilling the mixture into an overheads fraction and a bottoms fraction, cooling the overheads fraction, and then mixing it with the hot bottoms fraction to obtain a pumpable slurry.

2. Description of the Prior Art

Pumping viscous hydrocarbon mixtures at temperatures below their pour point is very critical. Heat transfer methods and chemical agents to improve fluid flow properties have been studied. In general, these solutions have proved feasible with low, waxy hydrocarbon mixtures, but not with the more waxy hydrocarbon mixtures. Also, viscous hydrocarbon mixtures have been suspended in water and the combination pumped at temperatures below the pour point of the crude oil.

Patents representative of the prior art include the following:

Kells (U.S. Pat. No. 271,080) separates wax from crude oil by pumping the crude oil in small streams into the bottom of a tank containing a brine at a temperature sufficiently low to congeal the wax. The congealed wax is recovered in the brine.

Coberly (U.S. Pat. No. 2,303,823) teaches pipelining waxy crude oils by blowing cold gas through the oil to form wax crystals and then pumping the mixture at low temperatures.

Scott (U.S. Pat. No. 3,292,647) teaches transporting waxy crude oils in a pipeline by shearing the crude at a temperature below its pour point to break down the wax and form a fine dispersion, then introducing a gas, e.g. $N_2$, $CO_2$ and natural gas, into the sheared crude to prevent regrowth of the wax crystals, and thereafter pumping the composition.

Button et al (U.S. Pat. No. 3,393,144) teaches fractionating distillate fuel into a high boiling point fraction (contains a majority of wax) and a low boiling point fraction (contains an insignificant amount of wax), mixing a wax crystal modifier with the high boiling fraction and chilling the mixture to precipitate the wax. The wax particles are then agitated at a low temperature to form a slurry.

Russell and Chapman in *J. Inst of Petroleum* 57, 117 (1971) teaches the importance of controlled shearing of crude oil during cooling to obtain a pumpable system. The cooling is effected on the composite crude oil by external cooling. With this type of cooling, some of the lower molecular weight hydrocarbons are occluded within the congealed wax particles.

Watanabe (U.S. Pat. No. 3,468,986) forms spherical particles of wax by melting the wax, then dispersing it in a non-solvent liquid, e.g. water, at a temperature above the solidification temperature of the wax, and thereafter cooling the dispersion to solidify the wax droplets.

Titus (U.S. Pat. No. 3,527,692) transports crushed oil shale, slurried in 140–325 mesh solvent, e.g. crude oil, retorted shale oil, or a fraction thereof.

Eagen et al (U.S. Pat. No. 3,681,230) and Gudelis et al (U.S. Pat. No. 3,644,195) dewax oil by contacting the oil with a cold solvent under intense agitation.

Merrill et al (U.S. Pat. No. 3,804,752) separate waxy hydrocarbon mixtures into an overheads fraction and a bottoms fraction, congeal the bottoms fraction into spheres and mix the particles within the overheads fraction to obtain a pumpable slurry.

The art has also used heat, e.g. heat exchangers placed intermittently along the pipeline, to maintain the crude oil above its pour point and thus facilitate pumping. The main disadvantage of this method is that the crude tends to "set up" during shut downs.

SUMMARY OF THE INVENTION

Waxy hydrocarbon mixtures are separated into at least an overheads fraction and a bottoms fraction, the overheads fraction is cooled to a temperature above its pour point but sufficiently low that, when mixed with the bottoms fraction, the resulting mixture will have a temperature below that at which the mixture is to be transported, then the cooled overheads fraction is mixed with a portion of the bottoms fraction at a shear rate below about 20 $sec^{-1}$ to obtain a pumpable slurry. The resulting mixture is a slurry suitable for transportation, preferably in a conduit, at conventional pipeline temperatures.

BRIEF DESCRIPTION OF THE DRAWING

The FIGURE represents a preferred embodiment of the invention wherein shale oil is distilled to obtain an overheads fraction and a bottoms fraction. The overheads fraction is cooled, then mixed with the hot bottoms fraction with agitation to form a slurry which is introduced into a pipeline for transportation.

DESCRIPTION OF THE PREFERRED EMBODIMENTS

The hydrocarbon feed contains about 1 to about 80% wax and preferably about 5 to about 65 and more preferably about 10 to about 50% wax. "Wax" is defined as the precipitate formed by dissolving one part of hydrocarbon mixture in ten parts of methylethyl ketone at about 80°C. and cooling the mixture to −25°C. Examples of such waxy hydrocarbon mixtures include some crude oils, shale oil (including chemically modified shale oil such as hydrotreated shale oil), tar sand oil, fuel oil, gas oil, or any hydrocarbon mixture which contains wax or mixtures thereof. Crude oils having high pour points are especially useful with this invention, especially those having pour points above 22°C.

The feed is separated into at least two fractions, an overheads fraction which will normally have a relatively low pour point and a bottoms fraction which will normally have a relatively high pour point and which contains at least a majority and preferably all of the wax fraction. Fractions other than the overheads fraction and bottoms fraction can be obtained and used in the resulting slurry or can be used in other processes.

Fractionation can be by any process which separates the hydrocarbon into an overheads fraction and a bottoms fraction. Optionally, a portion of the bottoms fraction can be cracked and/or hydrogenated during fractionation or before it is admixed with the overheads fraction. From a practical standpoint, there may be no advantages to more than two cuts from the fractionation.

Before the overheads fraction is mixed with the bottoms fraction, the two fractions must meet certain conditions.

The overheads fraction must be cooled to a temperature above its pour point, but sufficiently low so that when it is mixed with the hot bottoms fraction, the resulting temperature will be at least below that at which the slurry is to be transported. Preferably, the resulting temperature is less than about 10° and more preferably less than about 5°C. below the temperature at which the slurry is transported.

The viscosity of the overheads fraction should not be greater than about 10 cp at the seasonably minimum temperature of the pipeline, e.g. 4°–20°C. for the Midwest U.S.A. and preferably less than about 6 cp. at the seasonably minimum temperature of the pipeline. In general, the paraffinic hydrocarbon molecules within the overheads fraction should not contain more than about 20 carbon atoms for a minimum average temperature of 4°C. or 25 carbon atoms for an average minimum temperature of 20°C.

The bottoms fraction, before it is admixed with the overheads fraction, is preferably at a temperature above which there is substantially no crystalline structure (including hydrocarbons other than wax). Temperatures about 75°C. and preferably about 50°C. and more preferably about 25°C. above the pour point of the bottoms fraction are generally operative with this invention. If the bottoms fraction has not been cooled to a temperature below which crystallization starts since coming from the fractionation, it can be slurried with the overheads fraction without heating to obtain a pumpable mixture. The bottoms fraction can be cooled to a temperature above that at which wax crystallization starts before mixing.

It is necessary that the bottoms fraction be hot when slurried with the cooled overheads fraction. If the bottoms fraction is cooled before mixing to a temperature at which wax crystalline growth occurs, the resulting mixture will be more difficult to pump. It is postulated that different wax forms result when the cooled overhead is mixed with the hot bottoms when compared to mixing both chilled overheads fraction and chilled bottoms fraction or when hot overheads and hot bottoms fractions are mixed and then chilled. When the overheads and bottoms fractions are cooled in a homogeneous mixture and when both are chilled and then mixed, only slight reductions in pressure drops are obtained from the resulting slurry in a pipeline compared to the reduction in pressure drop obtained by this invention.

The overheads is preferably mixed with the bottoms at a low shear rate. That is, the shear rate is desirably below about 20 sec$^{-2}$ and more preferably below about 10 sec$^{-1}$, and most preferably below 5 sec$^{-1}$. This shear rate, inter alia, gives large dispersed particles which cause improved pumpability. If a high shear rate is used, a finely dispersed, poorly pumpable slurry is formed. More specifically, when a shear rate of 30 sec$^{-1}$ is used during the mixing of the overhead and bottoms fractions, the pumping pressure may increase as much as 30% over what it would have been under low shear conditions—see Example 2.

Additives or diluents (liquid or gaseous) may be added before, during or after the slurrying of the chilled overheads with the bottoms fraction. For example, additives such as surfactants, dispersing agents, agents to improve the fluidity of the resulting mixture, etc. or diluents such as carbon dioxide, crude oil, straight run gasoline, natural gas, methane, propane, etc. can be added if desired.

It is preferred that diluents do not readily solubilize or dissolve the wax.

The slurry should be maintained at a temperature below the solution temperature during storage and transportation. The solution temperature is defined as that temperature at which a major portion of the wax is in solution.

During storage and transportation, temperature of the conduit is preferably maintained above the pour point of the overheads fraction and preferably at least about 5° and more preferably 10° and most preferably at least 15° above the pour point.

Concentration of the wax particles in the slurry is preferably about 1 to about 60%, and more preferably about 5 to about 55%, and most preferably about 10 to about 45% by weight.

The slurry can be transported in any conventional transportation system. For example, it can be transported in tanks, barges, tankers, pipelines, or stored in holding tanks. Preferably, the transportation system is a pipeline or a conventional pipeline system including holding tanks, etc.

Temperature of the slurry transportation is preferably below the solution temperature of the wax particles in the overheads fraction. The slurry temperature can exceed the solution temperature of the wax for short periods of time so long as substantial amounts of the wax particles are not reliquefied or solubilized into the overheads fraction. If the temperature does exceed the solution temperature, the slurry can still be effectively transported in the pipeline as long as the temperature does not cycle more than preferably about 3°–5°C. below the highest temperature reached by the slurry during transportation. Also, as long as the temperature is increasing during the pipelining, even above the solution temperature, there is no detrimental effect. However, when the temperature decreases to more than about 5°C. below the highest reached during transportation, adverse pressure drops may occur.

Working Examples

The following examples teach working embodiments of the invention. Unless otherwise specified, the percents are based on weight. Examples 1 and 2 use the same overhead and bottom fractions.

EXAMPLE 1

The bottoms fraction material is a wax that has a melting point of about 82°C. and an average pour point of about 52°C. The overheads fraction has an average pour point of about −20°C. In all cases, the resulting slurry contains 32.5% by weight of the bottoms fraction in the overheads fraction. Three samples are prepared as follows:

Sample 1: the bottoms fraction and the overheads fraction are mixed and heated to 121°C. and then cooled slowly and statically to 32°C. and thereafter cooled to 4°C. and flowed at a rate of 20 ml/sec. in a ½ inch pipeline that is 26 feet long.

Sample 2: the overheads fraction is cooled to 4°C. in the same ½ inch pipeline. While it is circulating at the rate of 20 ml/sec., the bottoms fraction, at 82°C., is added directly to the pipeline through a "T" connection at a rate of 32 gms/min. It is estimated that the shear rate is about 30 sec$^{-1}$.

Sample 3: the overheads fraction is chilled to 4°C. in a slurry tank and the bottoms fraction, at 82°C., is slowly mixed into the slurry tank, stirred with a paddle estimated to create a shearing rate of about 3 sec$^{-1}$.

Comparison of pressure drops caused by the three different treatments in the ½ inch pipeline at 4°C. are illustrated in Table 1.

Table 1

| Flow Rate, ml/sec | PRESSURE, psi/10 ft of ½" line | | |
|---|---|---|---|
| | Sample 1 | Sample 2 | Sample 3 |
| 10 | 11 | 10 | 9 |
| 15 | 12 | 11 | 10 |
| 20 | 13 | 12 | 11 |
| 30 | 16 | 14 | 12 |

Sample 1 resembles the teachings of Russell and Chapman in *J. Inst. of Petroleum*, supra, except the shear is at a lower rate than their preferred shear rate. Sample 2 represents high shear mixing conditions based upon teachings of U.S. Pat. Nos. 3,644,195 and 3,681,230 which define the "Dilchill" process. These prior art references teach that these types of conditions should be optimum for pumping the wax containing mixture.

The lower shear conditions of this invention are demonstrated to be preferred.

EXAMPLE 2

In samples 4 and 5, 30 weight percent of the same bottoms fraction is mixed with 70% of the overheads fraction. The wax is first heated to 82°C. and then added to an overheads fraction which is at 4°C. In sample 4, addition of the hot bottoms fraction is made in a tank which is an externally cooled tank equipped with a stirring paddle that imparts a low shear rate of about 3 sec$^{-1}$ to the mixture. The resulting slurry, at 4°C., is then pumped in the pipeline of Example 1. In Sample 5, the hot bottoms fraction is added directly to the ½ inch pipeline which is circulating at a rate of 26.7 ml/sec in which it is estimated that the shear rate is about 30 sec$^{-1}$. Final temperature of Sample 5 is 4°C. The pressure drop data for Samples 4 and 5 are illustrated in Table 2.

Table 2

| Flow Rate, ml/sec | PRESSURE, psi/10 ft of ½" line | |
|---|---|---|
| | Sample 4 | Sample 5 |
| 15.4 | 4.4 | 6.0 |
| 20.0 | 5.1 | 6.2 |
| 26.7 | 5.4 | 6.6 |
| 39.2 | 6.0 | 7.3 |

As the data indicate, the slurry made from the tank addition showed less pressure drop than that made from the direct addition of the hot bottoms fraction to the ½ inch pipeline.

EXAMPLE 3

Sample 6 has a pour point of 27°C. and contains about 10% wax. Sample 7 is prepared from Sample 6 by distilling Sample 6 to obtain 53 weight percent overhead fraction and 47 weight percent bottoms fraction. A slurry is obtained by adding the bottoms fraction at 51°C. to the overheads fraction at 4°C. under low shear conditions (less than 5 sec$^{-1}$.) Pressure drop data is the ½ inch pipeline for Samples 6 and 7 are illustrated in Table 3:

TABLE 3

| Flow Rate, ml/sec | PRESSURE, psi/10 ft of ½" line | |
|---|---|---|
| | Sample 6 | Sample 7 |
| 10 | 9.5 | 4.8 |
| 15 | 11.7 | 5.8 |
| 20 | 13.9 | 6.9 |

It is not intended that this invention be limited by the specifics taught herein. Rather, all equivalents obvious to those skilled in the art are intended to be incorporated within the scope of the invention as defined within the specification and appended claims.

What is claimed is:

1. A process of transporting and/or storing a waxy hydrocarbon mixture containing 1 to about 80% by weight of wax comprising fractionating the hydrocarbon mixture into at least an overheads fraction and a bottoms fraction (contains at least a majority of the wax), mixing at a shear rate less than about 20 sec$^{-1}$ at least a portion of the overheads fraction which has been cooled to a temperature sufficiently low so that when it is slurried with the bottoms fraction the resulting temperature will be at least below that at which the hydrocarbon mixture will be transported, with at least a major portion of the bottoms fraction which has been heated to a temperature above that at which wax crystallization is effected, to obtain a slurry and thereafter storing or transporting the slurry.

2. The process of claim 1 wherein the shear rate is less than about 10 sec$^{-1}$.

3. The process of claim 1 wherein the shear rate is less than about 5 sec$^{-1}$.

4. The process of claim 1 wherein the resulting slurry is transported in a conduit at a temperature below the solution temperature of the dispersed bottoms fraction in the overheads fraction.

5. The process of claim 1 wherein the hydrocarbon contains about 5 to about 65% by weight of wax.

6. The process of claim 1 wherein the hydrocarbon contains about 10 to about 50% by weight of wax.

7. The process of claim 1 wherein the overheads fraction has a viscosity less than about 10 cp. at the seasonably minimum temperature of the transportation system.

8. The process of claim 1 wherein the resulting slurry contains about 5 to about 55% of wax.

9. The process of claim 1 wherein the resulting slurry contains about 10 to about 45% of wax.

10. The process of claim 1 wherein the overheads fraction is cooled to a sufficiently low temperature such that when mixed with the bottoms fraction, the resulting temperature of the mixture is less than about 5°C. below the temperature at which the slurry is to be transported.

11. The process of claim 1 wherein external cooling is used during mixing to remove a portion of the heat from the bottoms fraction.

12. The process of claim 1 wherein the waxy hydrocarbon mixture is a waxy crude oil, shale oil, or hydrogenated shale oil.

13. A process of transporting a waxy hydrocarbon mixture containing about 5 to about 65% by weight of wax comprising distilling the hydrocarbon mixture into at least an overheads fraction and a bottoms fraction (contains at least a majority of the wax), mixing at a shear rate less than about 10sec$^{-1}$, the overheads fraction which has been cooled to a temperature sufficiently low so that when it is mixed with the bottoms fraction the temperature of the mixture will be below the temperature at which the mixture is to be transported, with at least a major portion of the bottoms fraction which is at a temperature at least above that at which wax crystallization occurs in the bottoms fraction, to obtain a slurry suitable for transportation, and thereafter transporting the slurry in a pipeline.

14. The process of claim 13 wherein the slurry contains about 10 to about 45% by weight of wax.

15. The process of claim 13 wherein the hydrocarbon mixture is a waxy crude oil, shale oil or hydrogenated shale oil.

16. A method of preparing a waxy hydrocarbon slurry suitable for storage and/or transportation wherein the waxy hydrocarbon mixture contains about 1 to about 80% by weight of wax, comprising fractionating the hydrocarbon mixture into at least an overheads fraction and a bottoms fraction, the bottoms fraction containing at least a majority of the wax, admixing at a shear rate less than about 20 sec$^{-1}$ the overheads fraction which has been cooled to a sufficiently low temperature such that when admixed with the bottoms fraction, the temperature of the resulting slurry will be less than the temperature at which the slurry is transported, with at least a major portion of the bottoms fraction which is at a temperature above that at which substantial wax crystallization is effected, to obtain a pumpable slurry.

17. The process of claim 16 wherein the pumpable slurry contains about 5 to about 55% by weight of the wax.

* * * * *

UNITED STATES PATENT OFFICE
CERTIFICATE OF CORRECTION

Patent No. 3,910,299            Dated October 7, 1975

Inventor(s) James E. Tackett and Paul H. Stewart

It is certified that error appears in the above-identified patent and that said Letters Patent are hereby corrected as shown below:

Column 3, line 48:     delete "$sec^{-2}$" and substitute therefor --$sec^{-1}$--

Column 4, line 21:     after "slurry" add --during--

Column 5, line 65:     delete "is" and substitute therefor --in--

Signed and Sealed this

Twenty-ninth Day of May 1979

[SEAL]

Attest:

RUTH C. MASON
*Attesting Officer*

DONALD W. BANNER
*Commissioner of Patents and Trademarks*